Nov. 11, 1969   J. D. SHAW   3,477,432
COMBINATION MIXING AND INJECTING MEDICAL SYRINGE
Original Filed Sept. 21, 1964   4 Sheets-Sheet 3
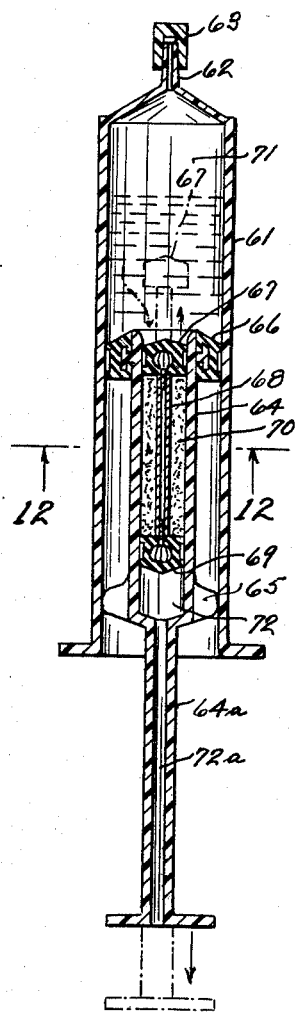
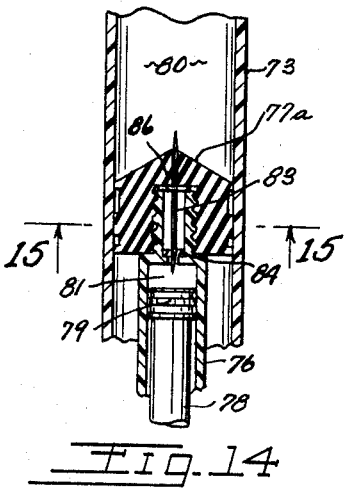
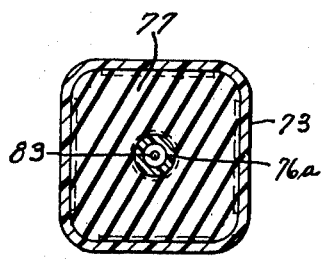
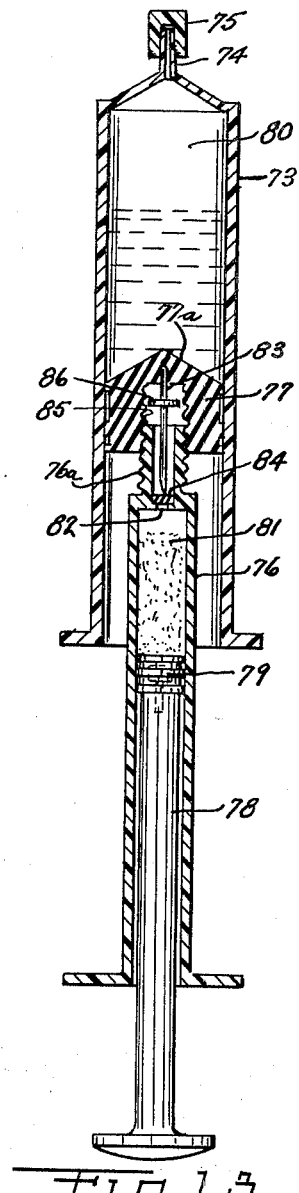
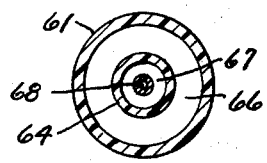
INVENTOR.
JOSEPH D. SHAW
BY
Meyer, Baldwin, Doran & Egan
ATTORNEYS

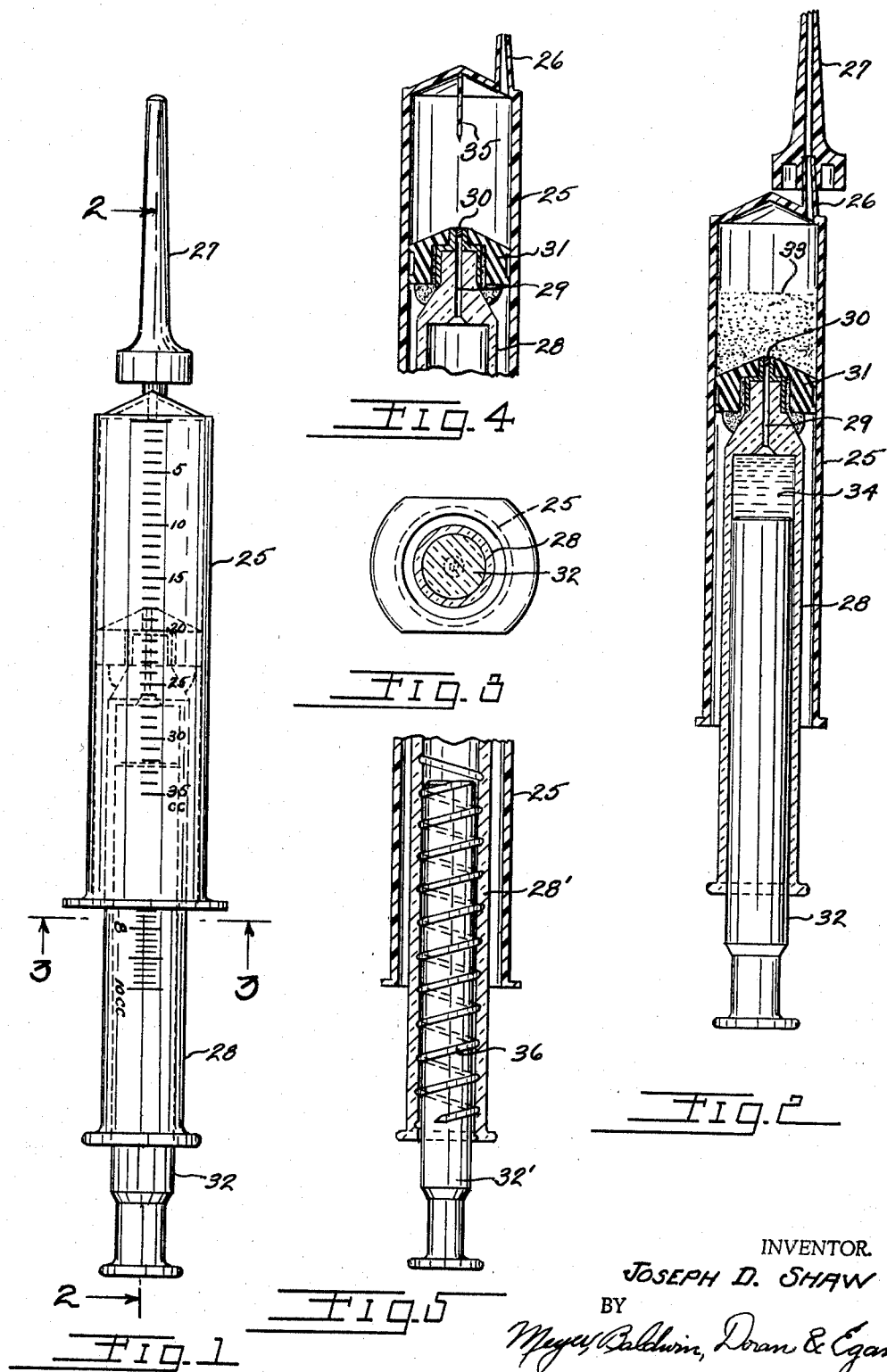

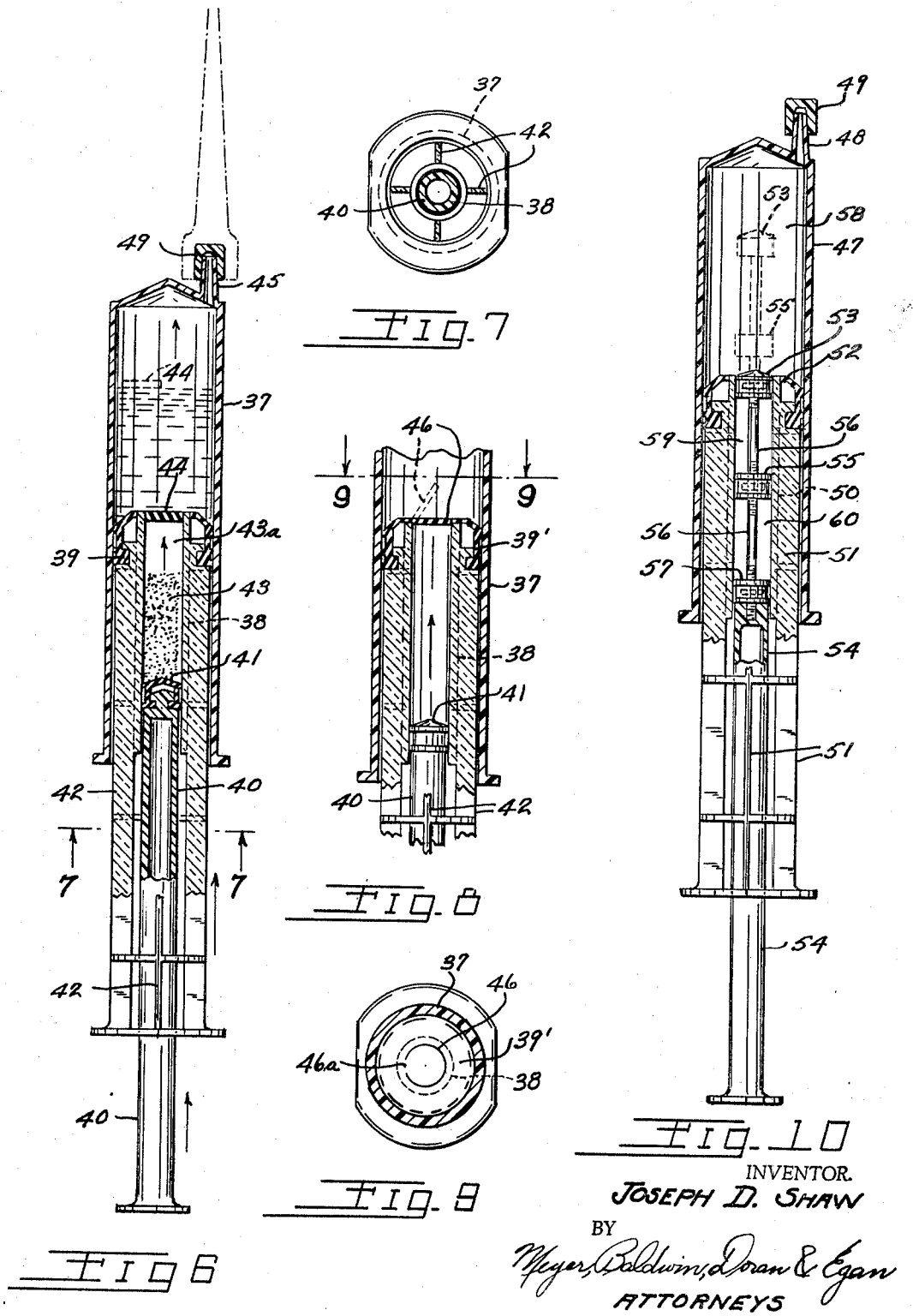

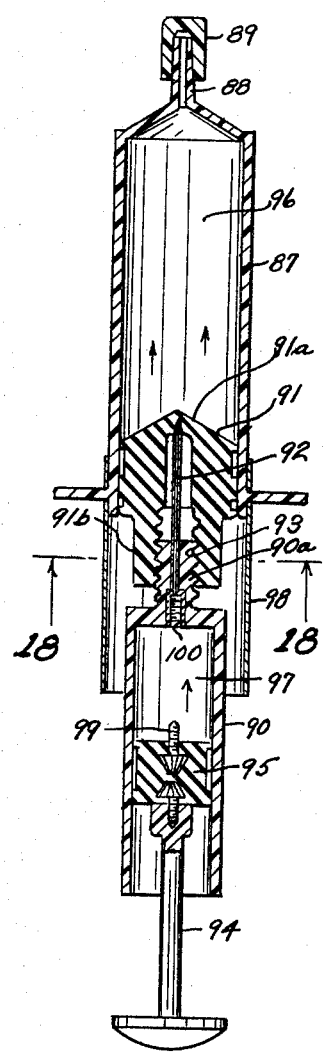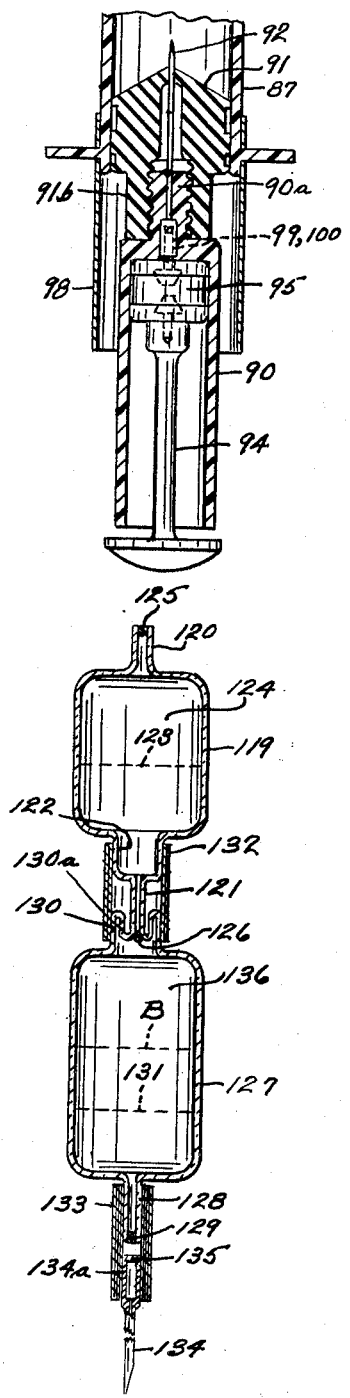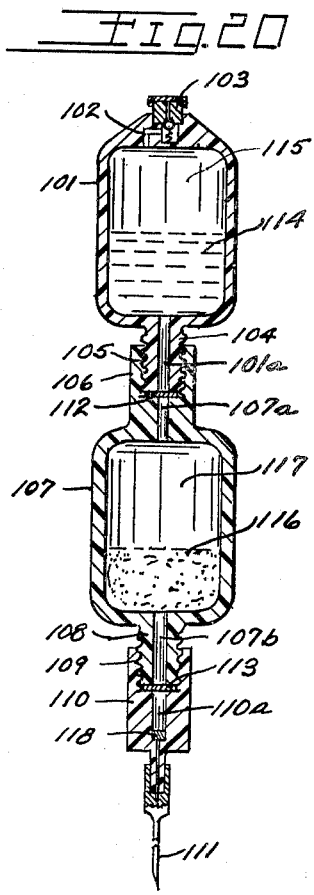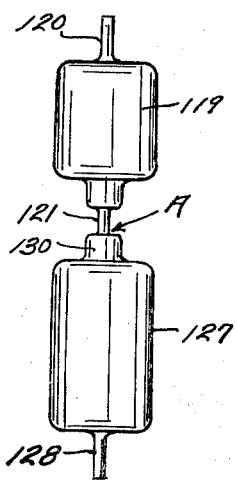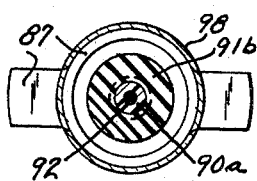

United States Patent Office 3,477,432
Patented Nov. 11, 1969

3,477,432
COMBINATION MIXING AND INJECTING MEDICAL SYRINGE
Joseph Denman Shaw, 1944 E. 123rd St.,
Cleveland, Ohio 44106
Continuation of application Ser. No. 384,148, Sept. 21, 1964. This application Aug. 24, 1967, Ser. No. 663,167
Int. Cl. A61m 5/00; A61j 1/00
U.S. Cl. 128—218                                    5 Claims

ABSTRACT OF THE DISCLOSURE

A combined mixing and injecting syringe has an outer barrel to contain a first ingredient and provided with an injection outlet, has an inner barrel slidable in a sealed manner longitudinally of the outer barrel for containing a second ingredient, and has a plunger slidable in a sealed manner longitudinally of the inner barrel. The inner barrel has a discharge opening communicating with the hollow of the outer barrel and providing a fully open outlet from the inner barrel normally closed by a full size plug which is of less diameter than the outer barrel so as to clear the discharge opening for free exit of a dispensable solid ingredient from the inner barrel to mix with the first ingredient in the outer barrel, after which the mixture may be injected by relative movement of the two barrels. Various expedients are used to cause opening movement of the plug.

---

This is a continuation of application Ser. No. 384,148, filed July 21, 1964, now abandoned.

This invention relates to a combined mixing and injecting syringe useful among other things in medical practice for the injection of a two-ingredient mixture.

One of the objects of the present invention is the provision of a syringe whereby one ingredient, such as a powder or liquid, may be dissolved in a suitable diluent second ingredient and then injected into a patient by the use of this novel syringe.

Other objects of this invention include the arrangement of the parts for quick assembly and disassembly for loading or cleaning, means for quickly measuring the amounts of the mixed ingredients, and other objects and advantages as will be apparent in the accompanying drawings and description.

In the drawings,

FIG. 1 is a side elevational view of one embodiment of my invention;

FIG. 2 is a central sectional view of the device of FIG. 1;

FIG. 3 is a cross-sectional view taken along the line 3—3 of FIG. 1;

FIG. 4 is a fragmental sectional view similar to the upper portion of FIG. 2 and showing a modified construction for breaking a seal permitting mixing of ingredients;

FIG. 5 is a view similar to the lower portion of FIG. 2 and showing a modified construction for providing axial movement of a plunger relative to the inner barrel;

FIG. 6 is an elevational view mostly broken away in central section showing another embodiment of this invention with a different type of seal separating two ingredients before mixing;

FIG. 7 is a sectional view of the same taken along the line 7—7 of FIG. 6;

FIG. 8 is a view chiefly in central section similar to an intermediate portion of FIG. 6 and showing a modified form of the seal separating the two ingredients before mixing;

FIG. 9 is a sectional view of the same taken along the line 9—9 of FIG. 8;

FIG. 10 is a view of a further modification of this invention taken partly in elevation and partly in central section;

FIG. 11 is still another modification of this invention in central sectional view;

FIG. 12 is a cross-sectional view taken along the line 12—12 of FIG. 11;

FIG. 13 is a central sectional view through another embodiment of my invention;

FIG. 14 is a sectional view of an intermediate portion of FIG. 13 with the parts in a different actuated position;

FIG. 15 is a cross-sectional view, enlarged, taken along the line 15—15 of FIG. 14;

FIG. 16 is a cross-sectional view showing another non-circular section through the parts similar to FIG. 15 and illustrating how an embodiment of FIGS. 13 and 14 might be constructed;

FIG. 17 is a central sectional view through another embodiment of this invention;

FIG. 18 is a cross-section view taken along the line 18—18 of FIG. 17;

FIG. 19 is a central sectional view of the intermediate portion of FIG. 17 showing an operated position of the parts;

FIG. 20 is a central sectional view through another modification of the invention;

FIG. 21 is a central sectional view through another modification of this invention related to FIG. 20; while FIG. 22 is an elevational view of certain of the parts of FIG. 21 in the process of assembly.

Prior to this invention, to the best of my knowledge and belief, there has been an unmet need for a mixing syringe wherein two or more ingredients could be easily placed in separate chambers of the syringe with no mixing occurring until just before the injection of the combined ingredients into a patient and constructed with easily manipulated parts whereby a breachable passageway communicating with the chambers containing the separate ingredients is adapted to be easily and quickly opened followed by mixing of the ingredients in a mixing chamber and the immediate propulsion of the contents out of the syringe.

In the embodiment shown in FIGS. 1, 2 and 3, an outer liquid retaining barrel 25 is open at the lower end as viewed in the drawings and closed at the upper end save for a discharge outlet 26. Those skilled in this art will understand that the outlet 26 may be easily connected or disconnected a rectal tip 27 or a standard hypodermic needle as shown in some of the other views of the drawings. An inner liquid retaining barrel 28 is adapted to move axially in and out of the open end of the barrel 25.

This inner barrel has a discharge opening 29 adapted to communicate with the discharge end of the barrel 25. I have called this a breachable passageway inasmuch as it is initially closed by means of a breachable seal 30 which in this case might be vaseline, silicone rubber or a number of other suitable materials. The upper end of barrel 28 as viewed in the drawings carries a gasket 31 of a suitable resilient material such as rubber or plastic adapted to sealingly engage the inner walls of the outer barrel 25. The parts of the gasket and the inner barrel 28 are rigidly connected together as shown in the drawings. The other end of barrel 28 is open to receive a reciprocatable plunger 32 which sealingly engages the interior walls of the barrel 28. In this form of the invention, glass parts are fitted with such close tolerances that there is to all intents and purposes a seal between the plunger 32 and the barrel 28. In other forms of the invention an annular gasket seal is provided for the same purpose.

The inner and outer barrels and the plunger described in various embodiments of this invention are preferably made of glass or reasonably transparent plastic for reasons of economy, ease of sterilization, and the desirability of looking through the equipment to note the position of the ingredients. Such translucent or transparent barrels may be provided with measuring indicia if desired and as shown in FIG. 1. While these indicia have not been in all of the embodiments in the drawings, it will be understood that this feature of the invention may be applied to any of the embodiments.

Referring to FIG. 2, in the use of this embodiment, a measured amount of a first ingredient such as a powder 33 is placed in the outer barrel 25 before inserting the inner barrel 28 with its attached gasket 31. A second ingredient 34 is easily loaded into the inner barrel 28. This may be done by sucking the ingredient 34 through the passageway 29 before the parts are assembled in the outer barrel, after which the seal 30 is applied to the passageway 29. Otherwise, the plunger 32 may be removed from the barrel 28 and the ingredient 34 inserted under vacuum, after which the plunger 32 is placed in the proper position. With the parts as shown in FIG. 2, the plunger 32 is driven into the barrel 28 causing sufficient pressure on the ingredient 34 to break the seal 30 and propel the contents of barrel 28 into the mixing chamber at the upper end of barrel 25. Ingredients 33 and 34 are then mixed by shaking the device a few times, after which the barrel 28 is driven into the barrel 25 to discharge the contents through the discharge outlet 26. Those skilled in this art will understand that if there is any air in the mixing chamber, the syringe will normally be held with the discharge end upwardly as shown in the drawings and the gasket 31 moved upwardly until all of the air is discharged before injecting the mixed contents into a patient.

It can be seen that after the hypodermic needle is inserted into a patient, the plunger 32 can be pulled back in order to attempt aspiration to help determine the position of the needle. Thereby the possibility of an intravascular injection is minimized when an intramuscular or subcutaneous injection is desired.

In the modification of FIG. 4, all of the parts are the same as described in connection with FIGS. 1 and 2 except that a pin 35 is rigidly fastened to the closed end of the barrel 25 and extending axially inwardly in such a position that when the barrel 28 and the gasket 31 are advanced upwardly as viewed in the drawings, the pin 35 will breach the seal 30 instead of relying upon the pressure of the ingredients 34 as described in connection with FIG. 2.

In the modification of FIG. 5, all of the parts are the same as described in connection with FIGS. 1 and 2 except that the inner barrel 28' and the plunger 32' have been provided with an interfitting thread 36 which prevents reciprocation of plunger 32' in the barrel 28' by means of a force exerted axially but which permits such reciprocation by actuation of the threaded connection. It will be noted that inner barrel 28' extends sufficiently beyond the open end of outer barrel 25 to be grasped by the fingers of an operator.

The embodiment of FIG. 6 does not differ greatly in operation from that just described. Here the outer barrel 37 has an inner barrel 38 reciprocatable therein and sealed by means of a gasket 39 fastened at the inner end of the inner barrel. A plunger 40 is reciprocatable in the inner barrel 38 and is sealed therein by means of a gasket 41. Radial fins 42 molded integrally with the inner barrel 38 serve to center the inner barrel in the outer barrel. Here the breachable passageway is the entire opening 43a of the mouth of the second ingredient chamber 43 inside of the barrel 38. This permits complete discharge of a powder ingredient from chamber 43. The stop plug 44 is of flexible resilient material such as gum rubber or the like which is adapted to be forced out of its closed position when plunger 40 exerts pressure on the ingredients in chamber 43. The gum rubber material will then float to a position such as that shown in broken lines at 44 in FIG. 6 and experience has shown it does not clog the discharge outlet 45. The inside dimensions of barrel 37 are sufficiently greater than the dimensions of plug 44 to insure a free passage of a powder ingredient from chamber 43 to mix with liquid in barrel 37. Other than mentioned here, this embodiment is operated in the same manner as the one shown in FIGS. 1 and 2. By "dispensable solid" as used in the specification and claims, I include finely divided solid material up to and including tablets which will pass through outlet 43a.

The modification shown in FIGS. 8 and 9 is exactly like that described in connection with FIGS. 6 and 7 except that the stop plug 46 is made from a sheet of rubber-like material forming part of the gasket 39' and the stop plug is cut away through the major portion of a circle as clearly seen in FIG. 9 but leaving a permanent connection at 46a with a neck of the rubber-like material 46. In operation of this device, the portion 46 is moved to the broken line position in FIG. 8 giving a substantially full dimension discharge opening to permit the ingredient in the inner barrel to be forced by plunger 40 into the outer barrel. Part 46 may be returned to the full-line, sealed position of FIG. 8 for another operation.

FIG. 10 shows another embodiment of the invention wherein the outer barrel 47 has a discharge outlet 48 which is closeable temporarily by a resilient cap 49. An inner barrel 50 is spaced by radial fins 51 for reciprocating movement in the outer barrel, such motion being sealed by a gasket 52 securely attached to the discharge end of the inner barrel. Here the breachable means for separating two ingredients comprises a stop plug 53 adapted to seal the discharge end of the inner barrel 50 in the full line position of FIG. 10. Spaced from the stop plug on the side thereof toward the plunger 54 is a partition plug 55. A rigid rod 56 connects the plug 53 and the plug 55 with the plunger 54 for movement back and forth with the plunger which reciprocates in the inner barrel 50. A gasket 57 acts as a seal between the plunger and the interior of the barrel 50. In the use of this device, a measured amount of a first ingredient is placed in the chamber 58. A measured amount of a second ingredient is placed in the chamber 59 between plugs 53 and 55. It will be obvious that with the parts disassembled, that is with the inner barrel removed from the outer barrel, the plugs may be moved to the broken line position of FIG. 10 for insertion of material in the chamber 59. The ingredient may be placed in the chamber 58 by holding the outer barrel with the closed end down and with the cap 49 in position. Then the parts may be assembled as shown in full lines in FIG. 10. In operation of the device in this form, the plunger 54 is moved upwardly until stop plug 53 opens the chamber 59 permitting the ingredient in that chamber to mix with the ingredient in chamber 58. A few shakes will mix the ingredients after which, with the discharge outlet upwardly, and with cap 49 removed, excess air may be expelled from chamber 58, after which a suitable tip or needle may be attached to the outlet 48 and the contents thoroughly mixed may be discharged into a patient.

For the above mentioned operation only two plugs are needed on the rod 56. One would be the stop plug 53 and the other would be either 55 or 57. Using the three plugs, three different ingredients may be mixed together. Chambers 58 and 59 would be charged with a first and second ingredient respectively, while chamber 60 would be charged with a third ingredient. In operation of this form of the device, with the plugs 53 and 55 moved to the broken line position of FIG. 10, the contents of both chambers 59 and 60 may be mixed with the contents of chamber 58 and then injected into a patient.

It can also be observed that with discharge outlet 48 closed by cap 49 by pulling backward on the plunger 50 a vacuum will be created in the chamber 58. The cap 53 will be pulled into the chamber 58 and the chamber 58 will be continuous with chamber 56. With further backward pull of plunger 50, the chamber 60 will be continuous with chamber 58. Furthermore, it can be seen in the previously described embodiments that by pulling back on the middle plungers the seal between the two chambers can be broken by means of the resultant vacuums.

FIG. 11 shows a further embodiment of this invention wherein the plunger of the previous embodiments is no longer manually moved from outside the inner barrel, but instead, a plunger plug is provided which is arranged to be moved by fluid pressures to produce the same result as in the previous embodiments. This syringe has an outer barrel 61 having a discharge outlet 62 at its normally closed end and this in turn may be covered temporarily by a cap 63 when desired. An inner barrel 64, held properly spaced by radial fins 65 is reciprocatable in the outer barrel. A gasket 66 seals between the inner and outer barrels as in previous forms of this invention. A stop plug 67 provides breachable means for sealing the first ingredient from the second ingredient. This stop plug is rigidly connected by rod 68 with a plunger plug 69 spaced from the stop plug 67 to provide a second ingredient chamber 70 between the plugs. As in other instances in this invention, the plugs seal against the walls of the inner barrel 64 in a liquid tight manner. In use of this embodiment, with the barrel 64 disassembled from the barrel 16, the plug 67 may be moved to the dot-dash position shown in FIG. 11 for the insertion of an ingredient in the chamber 70, after which the parts may be returned to the full line position of FIG. 11. Another ingredient is put into chamber 71 through the port 62. With the parts then assembled in the full line position of FIG. 11, and with the cap 63 in position, the barrel 64 is moved in a downward direction as viewed in the drawings by pulling upon extension of the barrel at 64a. This causes a partial vacuum in the chamber 71 and sucks the plugs 67 and 69 upwardly as viewed until 67 reaches the dot-dash position of FIG. 11. This movement of plugs 67 and 68 is made possible because that part of barrel 64 on the side of plunger plug 69 opposite the ingredient chamber 70, here marked 72, is provided with an air vent 72a leading to atmosphere. With the parts in the dot-dash position of FIG. 11, the ingredients of chambers 70 and 71 may be mixed together. Then the syringe is turned with 62 facing downward. The plunger 64a is pushed downward and the resulting pressure will reseal chamber 70 by means of the seal 67 moving upward. Now holding the syringe with 62 facing upward, the cap 63 may be removed so that air may be expelled from the upper portion of chamber 71, after which a suitable tip or needle is attached to the discharge outlet 62 for the injection of the mixture into a patient.

In FIGS. 13 and 14, is shown another embodiment of this invention. Here the outer barrel 73 has a discharge outlet 74 which may be closed if desired by a cap 75. An inner barrel 76 is reciprocatable in the outer barrel and is sealed thereagainst by a gasket 77. A plunger 78 is reciprocatable in the inner barrel and is sealed thereagainst by a gasket 79. Here the breachable means for initially sealing off the contents of the ingredients in chamber 80 and the ingredients in chamber 81 comprises a portion of the gasket 77 which is impervious at 77a where the contents of chamber 81 passing through a discharge opening 82 might reach the chamber 80 if it were not for the gasket portion 77a. For breaching this closure there is provided a hollow needle 83 which engages, or preferably is embedded in, the material of the gasket portion 77a as shown in FIG. 13. The opposite end of the needle is in position to communicate with the chamber 81 in the inner barrel but is temporarily sealed from such communication by means of a penetratable seal 84. Means is provided for relative movement of the inner barrel against the lower end of needle 83 as seen in FIG. 13 and for causing this needle to perforate the gasket portion 77a. The means here shown comprises a hollow neck 76a on the inner barrel 76 and provided with a male outer thread which coacts with a female inner thread 85 formed in a recess in gasket 77. A projection 86 rigid with the needle 83 is provided for a purpose which will presently appear. In use of this device, with the inner barrel removed from the oetur barrel, a measured amount of the first ingredient is placed in the chamber 80. Also, a measured amount of the second ingredient is placed in the chamber 81 and the plunger 78 pushed into proper position. The parts and then assembled as shown in FIG. 13. In this form of the invention, the outer barrel 73 and the coacting gasket 77 are non-circular in form as shown in FIG. 15. The corners are preferably rounded as shown so that a better seal may be had. Alternatively, some other form of non-circular barrel 73' might be adopted as in FIG. 16 with a gasket 77' of complementary shape, the forms here being elliptical. By rotating the inner barrel 76 about its longitudinal axis while holding the outer barrel 73 stationary, the threaded connection at 76a, 85 is operated to move the parts from the full line position of FIG. 13 about half way to the position shown in FIG. 14, thus causing a first penetration of the needle 83 through the seal 84. Further operation of the threaded connection to the position shown in FIG. 14 will cause the end of the neck 76a to engage against the projection 86 on the needle, thus forcing the needle 83 through the gasket portion 77a and establishing communication between chambers 80 and 81. Movement of plunger 78 into barrel 76 will now discharge the contents of chamber 81 into the mixing chamber 80 to mix with the first ingredient there. The mixture may then be propelled through the discharge outlet 74 by movement of the inner barrel 76 and gasket 77 as described in previous embodiments.

FIG. 17 shows another embodiment of this invention which has great similarity to FIG. 13 except that the seal 84 is not required. Here outer barrel 87 has a discharge outlet 88 which can be closed if desired by a cap 89. An inner barrel 90 is reciprocatable in the barrel 87 and is sealed thereagainst by a gasket 91. This gasket has a gasket portion 91a which is imprevious at the point where the second ingredient might mix with the first ingredient in the same manner as the gasket portion 77a described in FIG. 13. A hollow needle 92 is partially embedded in the gasket portion 91a at its pointed end, and has its other end rigidly secured in a projecting neck 90a of the inner barrel 90. A threaded connection is provided at 93 between the neck 90a and the gasket 91 for the purpose explained in connection with FIGS. 13 and 14. A plunger 94 is reciprocatable in inner barrel 90 and sealed thereagainst by a gasket 95. I have thus provided a first ingredient chamber 96 and a second ingredient chamber 97 which may be loaded in any of the manners previously explained and the parts placed in the position of FIG. 17. In this embodiment, the barrel 87 and the gasket 91 are circular in section so it is necessary to hold them manually if one is to actuate the threaded connection at 93. For this purpose the gasket 91 has a downwardly extending projection 91b which extends beyond the open end of the outer barrel 87 so as to be grasped by the fingers of the operator or otherwise. For sterility reasons it may be desirable to attach a sleeve 98 of flexible plastic or the like to the outside of barrel 87 covering the parts as shown in FIG. 17 so that the fingers may grip through the sleeve 98 against the projection 91b so as to maintain the parts clean and sterile. With the parts so held, the threaded connection 93 is operated to cause relative movement of the neck 90a of the inner barrel relative to the gasket 91, thus forcing the needle 92 to penetrate the gasket portion 91a and provide communication between chambers 96 and 97. Then, operation of the plunger 94 will force the contents of chamber 97 through the hollow needle 92 into chamber 96 where they may be mixed and injected into the patient as previously described.

If the above operation is to be carried out as one-time operation and then the syringe is discarded, then further improvements described herein are unnecessary. In other words, the parts heretofore described will permit the plunger 94 and barrel 90 to drive the gasket 91 into the barrel 87 sufficiently to inject the mixed ingredients from chambers 96 and 97. However, if it is desired to reciprocate the gasket 91 in the barrel 87, then a male threaded portion 99 is provided in the center of the gasket 95 extending axially in position to coact with the female thread 100 found in the socket end of the needle 92. Then, just before the parts reach the position of FIG. 19, the threaded connection at 99, 100 may be completed by holding the gasket projection 91b against rotation about its axis as previously described. This completes a rigid connection between the parts 94, 90 and 91 so that the gasket 91 may be reciprocated in the barrel 87 if desired.

Up to this point, the embodiments described herein use reciprocable plungers for propelling the second ingredient into the mixing chamber and for propelling the mixture to inject the patient. I shall now describe some embodiments utilizing gas or air under pressure as the propelling means.

In FIG. 20, I have shown a first ingredient chamber 101 which is preferably of glass and is closed except for an inlet for gas or air under pressure at 102 closed by a check valve 103. This capsule has a neck 104 which has a threaded connection 105 with a collar 106 which is integral with a second capsule 107 having an outlet neck 108 which has a threaded connection 109 with a closure cap 110 which supports at its discharge end a hypodermic needle 111 or the like. With the parts assembled as shown in FIG. 20, the outlet 101a of the capsule 101 is aligned with the inlet 107a of the capsule 107. A frangible seal 112 is provided between the passageways 101a and 107a initially. In like manner, the outlet 107b of capsule 107 is aligned with passageway 110a in the closing cap but these are separated by a frangible seal 113. A first ingredient 114 of measured amount is placed in capsule 101 and a charge of gas or air under pressure is applied in chamber 115. A measured amount of a second ingredient is placed in capsule 107. In use of this device, the seal 112 is first broken by utilizing threaded connection 105 to turn the neck 104 in the collar 106 causing a pressure to break the seal 112. The charge in chamber 115 will then drive the ingredient 114 through 101a and 107a into capsule 107 to mix with ingredient 116. At this time the charge in chamber 117 is derived from the charge originally in chamber 115. The needle 111 is then injected into the patient. The lower portion of closure cap 110 is then squeezed and released in order to help ascertain the position of the needle within the patient. The seal 113 is broken by utilizing the threaded connection 109 in the same manner as the threaded connection 105 was previously used. A filter is provided at 118 to prevent any foreign material, such as from the seals 112 or 113, from reaching the hypodermic needle A modification of the structure shown in FIG. 20 is illustrated in FIGS. 21 and 22. A first capsule 119 has a filling connection 120 at its upper end and a discharge port 121 at its lower end connected to the capsule by an integral collar 122. Initially, the capsule 119 is provided with the desired amount of one ingredient 123 and then a charge of compressed gas or air is provided in the upper portion of the capsule at 124 and the filling neck is closed by a fused bead 125 of glass or plastic depending upon what the capsule is made of. The discharge neck 121 is closed by a similar bead 126 prior to the filling operation. A second or lower capsule is provided having a discharge neck 128 closed by a fused bead 129. The upper end of this capsule has collar 130 which as originally formed is in the position shown in FIG. 22. Before any ingredient is placed in this embodiment the two capsules are secured together by fusing the neck 121 to the collar 130 at the point A as indicated in FIG. 22. The collar 130 is then heated and inverted as shown at 130 in FIG. 21 so as to place the seal 126 inside the collar 130.

Where the two capsules are joined together a flexible collar 132 of plastic or rubber is placed as shown in FIG. 21. This collar 132 may be made in place by means of a plastic which shrinks upon drying or by wrapping layers of flexible material in a continuous tube bound together by a suitable coating.

A collar 133 similar to that at 132 is provided to attach the discharge neck 128 of capsule 127 with the base end 134a of a hypodermic needle 134. Inside of the flexible collar 133 there is placed a filter 135 to protect the patient from any particles which might be released through the capsules during an injection.

In operation of the device of FIG. 21, the seal 126 is first broken by bending the flexible collar 132 permitting the ingredient 123 to move through outlet neck 121 into capsule 127 propelled by the fluid pressure charge 124. The total charge in capsule 127 then might rise as high as the line B and the contents may be shaken to mix them. For propelling the mixed contents out of capsule 127 into the patient, the charge 124 may be of sufficiently high pressure that when the ingredients are all in the capsule 127, the pressure fluid charge in chamber 136 will be of the right value for injecting the patient. Otherwise, a second gaseous charge may be placed in chamber 136 at the time that capsule 127 is first filled. The hypodermic needle 134 is inserted in the proper position in the patient and attempted aspiration is provided by squeezing and releasing the flexible collar 133 to test the proper position of the needle in the patient. The flexible collar 133 is then manipulated to break the seal and the hypodermic needle 134 is inserted in the proper position in the patient.

Note that in every case I have provided a mixing syringe having a mixing chamber closed except for an inlet and an outlet and a second measured ingredient chamber having a closed but breachable passageway communicating with the mixing chamber inlet. Means is provided for opening the breachable passageway and for propelling the contents of the ingredient chamber into the mixing chamber with the ingredient already placed there after which the mixing chamber may be shaken to thoroughly mix the contents. Means is then provided for propelling the contents of the mixing chamber through the outlet to inject a patient. This provides a quick and easy manner of mixing two ingredients in place in a syringe just before injecting a patient and is an improvement over methods previously known.

What is claimed is:

1. A combined mixing and injecting syringe comprising an outer liquid-retaining barrel open at one end and having a discharge outlet at the other end, an inner second-ingredient-retaining barrel open at one end and having a discharge opening at its other end, said discharge opening being substantially the full dimension of said inner barrel, breachable means having the dimensions of said discharge opening initially closing said discharge opening, said other end having means for sealing engagement with the interior surface of said outer barrel and being movable axially in said outer barrel, a plunger adapted to sealingly engage the interior surface of said inner barrel and movable axially endwise of said barrel, the inside dimensions of said barrel being sufficiently greater than the dimensions of said breachable means to permit a substantially clear opening of said discharge opening, whereby a first ingredient of a mixture may be placed in said outer barrel and held thereby said inner barrel, and a second ingredient of said mixture including a dispensable solid may be placed in said inner barrel and held there by said plunger, after which said breachable means may be opened and said second ingredient may be propelled, by manipulation of said plunger, through said discharge opening into said first ingredient in said outer barrel, said two ingredients may be mixed there, and then said mixture may be propelled by said inner barrel through said discharge outlet, said breachable means comprising a stop plug adapted to sealingly engage inside said inner barrel, said plunger comprising a plunger plug adapted to sealingly engage inside said inner barrel and spaced from said stop plug and rigidly connected thereto to provide a second ingredient chamber between said two last named plugs, there being an air vent on the side of said plunger plug opposite said chamber, whereby, with said discharge outlet closed, movement of said inner barrel away from said discharge outlet will cause a partial vacuum in said outer barrel and suck said stop plug out of said inner barrel after which said ingredients may be mixed and said mixture may be propelled out of said discharge outlet when opened.

2. A combined mixing and injecting syringe comprising an outer liquid-retaining barrel open at one end and having a discharge outlet at the other end, an inner second-ingredient-retaining barrel open at one end and having a discharge opening being substantially the full dimension of said inner barrel, breachable means having the dimensions of said discharge opening initially closing said discharge opening, said other end having means for sealing engagement with the interior surface of said outer barrel and being movable axially in said outer barrel, a plunger adapted to sealingly engage the interior surface of said iner barnrel and movable axially endwise of said barrel, the inside dimensions of said barrel being sufficiently greater than the dimensions of said breachable means to permit a substantially clear opening of said discharge opening, whereby a first ingredient of a mixture may be placed in said outer barrel and held there by said inner barrel, and a second ingredient of said mixture including a dispensable solid may be placed in said inner barrel and held there by said plunger, after which said breachable means may be opened and said second ingredient in said outer barrel, said two ingredients may be mixed there, and then said mixture may be propelled by said inner barrel through said discharge outlet, said breachable means comprising a stop plug adapted to sealingly engage inside said inner barrel, said plunger comprising a plunger plug adapted to sealingly engage inside said inner barrel and spaced from said stop plug and rigidly connected thereto to provide a second ingredient chamber between said two last named plugs, said two plugs rigidly connected to said plunger, said plunger extending out of said one end of said barrel, and axial movement of said plunger being sufficient to move at least said stop plug away from said discharge opening of said inner barrel to completely clear said opening.

3. A syringe as defined in claim 2 including a third plug in said inner barrel spaced from said second plug and sealingly engaging the walls of said inner barrel to provide a third ingredient chamber between said second and third plugs, and axial movement of said plunger being sufficient to move said stop plug and plunger plug away from said discharge opening of said inner barrel to completely clear said opening.

4. A combined mixing and injecting syringe comprising an outer liquid-retaining barrel open at one end and having a discharge outlet at the other end, an inner second-ingredient-retaining barrel open at one end and having a discharge opening at its other end, said discharge opening being substantially the full dimensions of said inner barrel, breachable means having the dimensions of said discharge opening initially closed said discharge opening, said other end having means for sealing engagement with the interior surface of said outer barrel and being movable axially in said outer barrel, a plunger adapted to sealingly engage the interior surface of said inner barrel and movable endwise of said barrel, the inside dimensions of said barrel being sufficiently greater than the dimensions of said breachable means to permit a substantially clear opening of said discharge opening, whereby a first ingredient of a mixture may be placed in said outer barrel and held there by said inner barrel, and a second ingredient of said mixture including a dispensable solid may be placed in said inner barrel and held there by said plunger, after which said breachable means may be opened and said second ingredient may be propelled, by manipulation of said plunger, through said discharge opening into said first ingredient in said outer barrel, said two ingredients may be mixed there, and then said mixture may be propelled by said inner barrel through said discharge outlet, said breachable means comprising a stop plug adapted to sealingly engage inside said inner barrel, said plunger comprising a plunger plug adapted to sealingly engage inside said inner barrel and spaced from said stop plug and rigidly connected thereto to provide a second ingredient chamber between said two last named plugs, and said manipulation of said plunger being effective to move said stop plug away from said discharge opening of said inner barrel to completely clear said opening.

5. A combined mixing and injecting syringe comprising an outer liquid-retaining barrel open at one end and having a discharge outlet at the other end and provided with means for attaching a hypodermic needle there, an inner second-ingredient-retaining barrel open at one end and having a discharge opening at its other end which is nearer the said other end of said outer barrel, said discharge opening being the full dimension of the diameter of said inner barrel, a plug separate from said barrels having the dimensions of said discharge opening initially closing said discharge opening, said plug having a diameter substantially less than the inside diameter of the outer liquid-retaining barrel, said other end of said inner barrel having means for sealing engagement with the interior surface of said outer barrel and being movable axially in said outer barrel, whereby said needle may be inserted in a patient and its position checked by aspiration, a plunger adapted to sealingly engage the interior surface of said inner barrel and movable axially endwise of said barrel, said plug being movable, by operator manipulation of said plunger in ingredient-injection direction, into the space between said other ends of said inner and outer barrels, the diameter of said outer barrel being great enough to permit said plug to move away from and to completely clear said discharge opening of said inner barrel, whereby a first ingredient of a mixture may be placed in said outer barrel and held there by said inner barrel, and a second ingredient of said mixture including a dispensable solid may be placed in said inner barrel and held thereby said plug, after which said plug may be forced out of said discharge opening and said second ingredient may be propelled, by manipulation of said plunger, through said discharge opening into said first ingredient in said outer barrel, clearing all of a second powder ingredient from said inner barrel, said two ingredients may be mixed in said other end of said outer barrel, and then said mixture may be propelled by said inner barrel through said discharge outlet.

References Cited

UNITED STATES PATENTS

| | | | |
|---|---|---|---|
| 2,708,438 | 5/1955 | Cohen | 128—218 |
| 3,232,117 | 2/1966 | Gilmont | 128—218 |
| 3,314,563 | 4/1967 | Mounier | 128—272 |

M. F. MAJESTIC, Assistant Examiner

RICHARD A. GAUDET, Primary Examiner

U.S. Cl. X.R.

128—272

UNITED STATES PATENT OFFICE

CERTIFICATE OF CORRECTION

Patent No. 3,477,432            November 11, 1969

Joseph Denman Shaw

It is certified that error appears in the above identified patent and that said Letters Patent are hereby corrected as shown below:

Column 9, line 43, after "opening" insert -- at its other end, said discharge opening --; line 60, after "gredient" insert -- may be propelled, by manipulation of said plunger, through said discharge opening into said first ingredient --; line 70, "barrel" should read -- barrels --. Column 10, line 19, after "movable" insert -- axially --.

Signed and sealed this 20th day of October 1970.

(SEAL)
Attest:

Edward M. Fletcher, Jr.            WILLIAM E. SCHUYLER, JR.
Attesting Officer                   Commissioner of Patents

UNITED STATES PATENT OFFICE
CERTIFICATE OF CORRECTION

Patent No. 3,477,432         Dated November 11, 1969

Inventor(s) Joseph Denman Shaw

It is certified that error appears in the above-identified patent and that said Letters Patent are hereby corrected as shown below:

In the heading to the four sheets of drawings, line 3, and in the heading to the printed specification, lines 6 and 7, "Sept. 21, 1964", each occurrence, should read -- July 21, 1964 --.

Signed and sealed this 4th day of May 1971.

(SEAL)
Attest:

EDWARD M. FLETCHER, JR.
Attesting Officer

WILLIAM E. SCHUYLER, JR.
Commissioner of Patents